US008417561B2

(12) United States Patent
Ghosh et al.

(10) Patent No.: US 8,417,561 B2
(45) Date of Patent: Apr. 9, 2013

(54) MARKET DYNAMICS

(75) Inventors: Debashis Ghosh, Charlotte, NC (US); Kurt Newman, Matthews, NC (US); David Joa, Pacifica, CA (US); Timothy J. Bendel, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 582 days.

(21) Appl. No.: 12/236,982

(22) Filed: Sep. 24, 2008

(65) Prior Publication Data

US 2010/0076813 A1   Mar. 25, 2010

(51) Int. Cl.
*G06Q 10/00* (2012.01)
(52) U.S. Cl. .................................... 705/7.34
(58) Field of Classification Search .................. 705/7.34
See application file for complete search history.

(56) References Cited

U.S. PATENT DOCUMENTS

| | | | | |
|---|---|---|---|---|
| 6,070,147 A * | 5/2000 | Harms et al. | ............... | 705/14.25 |
| 2003/0061132 A1 * | 3/2003 | Yu et al. | ........................... | 705/30 |
| 2004/0088190 A1 | 5/2004 | Timmons et al. | | |
| 2005/0055275 A1 * | 3/2005 | Newman et al. | ................ | 705/14 |
| 2006/0080631 A1 * | 4/2006 | Koo | ............................... | 716/17 |
| 2008/0109375 A1 * | 5/2008 | Ricci et al. | ....................... | 705/76 |
| 2008/0140503 A1 * | 6/2008 | Berwitz et al. | .................. | 705/10 |
| 2008/0208760 A1 | 8/2008 | Keithley | | |
| 2009/0299896 A1 * | 12/2009 | Zhang et al. | .................... | 705/38 |
| 2010/0076812 A1 * | 3/2010 | Ghosh et al. | ................... | 705/10 |
| 2010/0241462 A1 * | 9/2010 | Woodward | ........................ | 705/4 |

OTHER PUBLICATIONS

Bystrom, Hans. "Instantaneous Credit Risk Correlation." The Journal of Fixed Income, pp. 5-12, Fall 2007.*
U.S. Appl. No. 11/740,130.
International Search Report and the Written Opinion of the International Searching Authority mailed Nov. 17, 2009 for International Application No. PCT/US09/58093.

* cited by examiner

*Primary Examiner* — Susanna M Meinecke Diaz
(74) *Attorney, Agent, or Firm* — Michael A. Springs; Moore & Van Allen PLLC; Padowithz Alce

(57) ABSTRACT

Embodiments of the invention relate to systems, methods, and computer program products for providing a market-dynamics network that assesses social and economic market dynamics in specific geographic regions. For example, the market-dynamics network collects transaction data from a large number of business-merchants across a large number of geographic locations and appends geographic-location identifiers to the collected transaction data. The market-dynamics network then aggregates transaction data in specific geographic regions and, based on the aggregated transaction data, assesses social and economic market dynamics in those geographic regions.

37 Claims, 3 Drawing Sheets

MARKET DYNAMICS

FIELD

In general, embodiments of the invention relate to systems, methods, and computer program products for surveilling market dynamics and, more particularly, collecting and analyzing transaction data and, based thereon, assessing market dynamics in specific geographic regions.

BACKGROUND

Companies today spend a significant amount of resources on market research. For example, to identify consumer trends in a specific geographic area, companies rely on information obtained from focus groups and telephone, internet, and face-to-face surveys. Companies consider information obtained from this market research when making risk-management decisions and other business decisions, such as whether to expand into a new geographic market. However, in addition to being expensive and labor intensive, these known market-research methods obtain information from a relatively small sample of consumers. Accordingly, these known market-research methods may not provide reliable and comprehensive results.

Other market research, which includes data from large samples of consumers, is currently available, but this market research identifies consumer trends at a high level within large populations of large geographic areas, such as populations of entire states or countries. Because this market research is based on data obtained from large, predefined geographic areas, companies cannot reliably use this market research to understand and identify consumer trends within smaller geographic areas. Accordingly, this market research is not particularly useful for companies when making risk-management decisions and other business decisions, such as whether to expand into new geographic markets because such decisions require detailed information on small segments of the population. What's more, these known market-research techniques may provide out-of-date results. This is because, in the time required to collect the data and prepare the results, changes occur in the marketplace.

SUMMARY

Some embodiments of the invention relate to systems, methods, and computer program products for providing a market-dynamics network that assesses social and economic market dynamics in user-defined geographic regions. For example, the market-dynamics network collects transaction data from a large number of business-merchants across a large number of geographic locations and appends geographic-location identifiers to the collected transaction data. The market-dynamics network then aggregates transaction data in user-defined geographic regions and, based on the aggregated transaction data, assesses social and economic market dynamics in the user-defined geographic regions.

BRIEF DESCRIPTION OF THE DRAWINGS

Having thus described embodiments of the invention in general terms, reference will now be made to the accompanying drawings.

Figure 1:
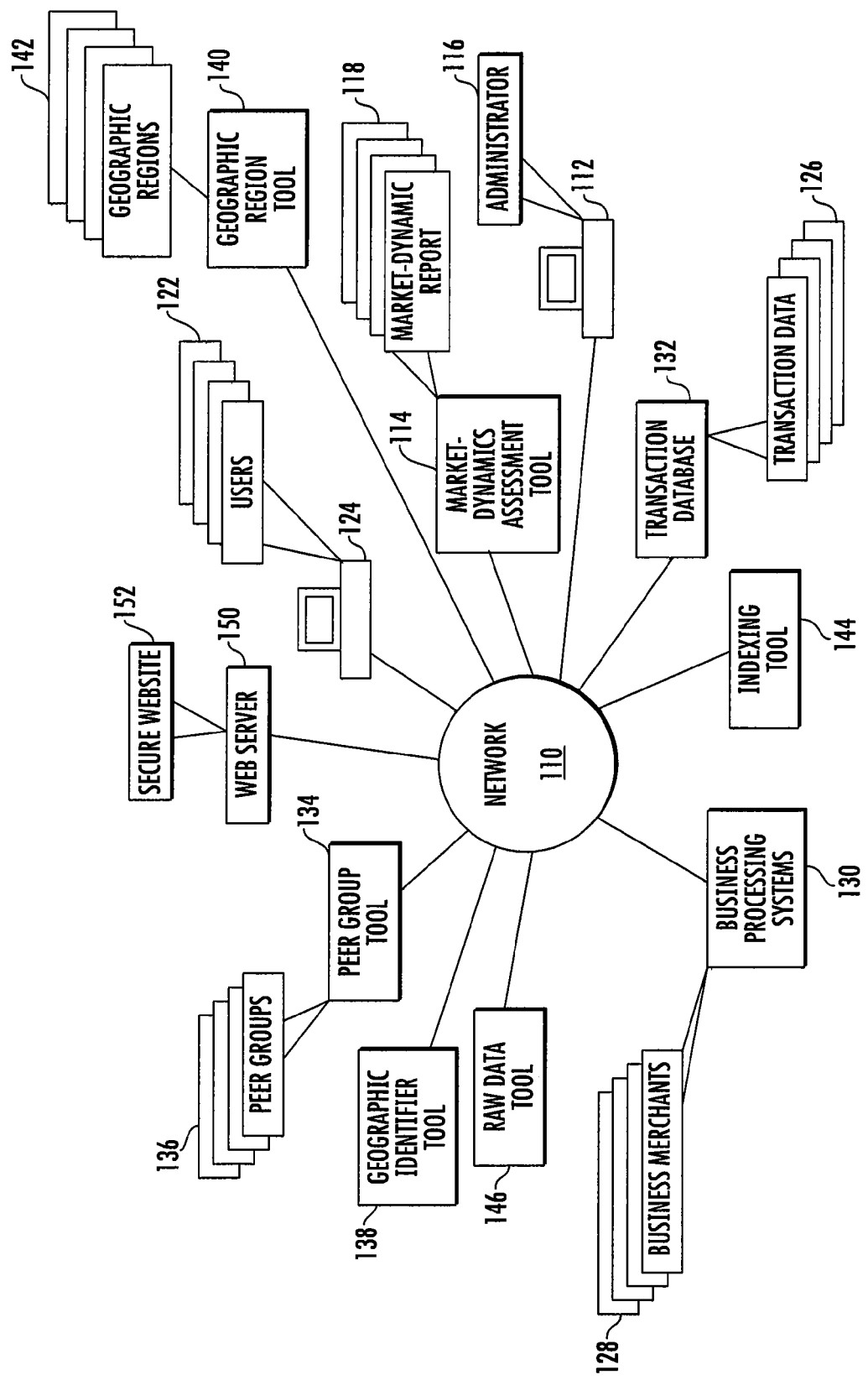

FIG. 1 illustrates an environment in which the processes described herein are implemented according to one embodiment of the invention.

Figure 2:
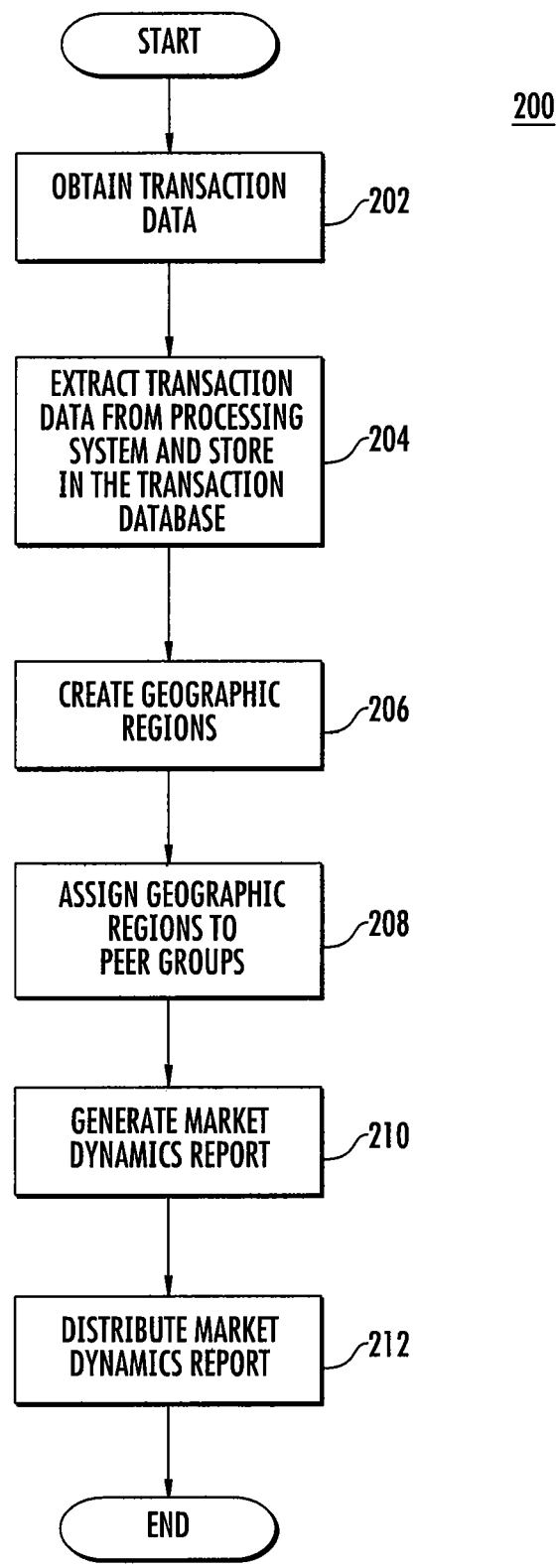

FIG. 2 is a flow chart illustrating an exemplary process of generating a market-dynamics report, according to one embodiment of the present invention.

Figure 3:
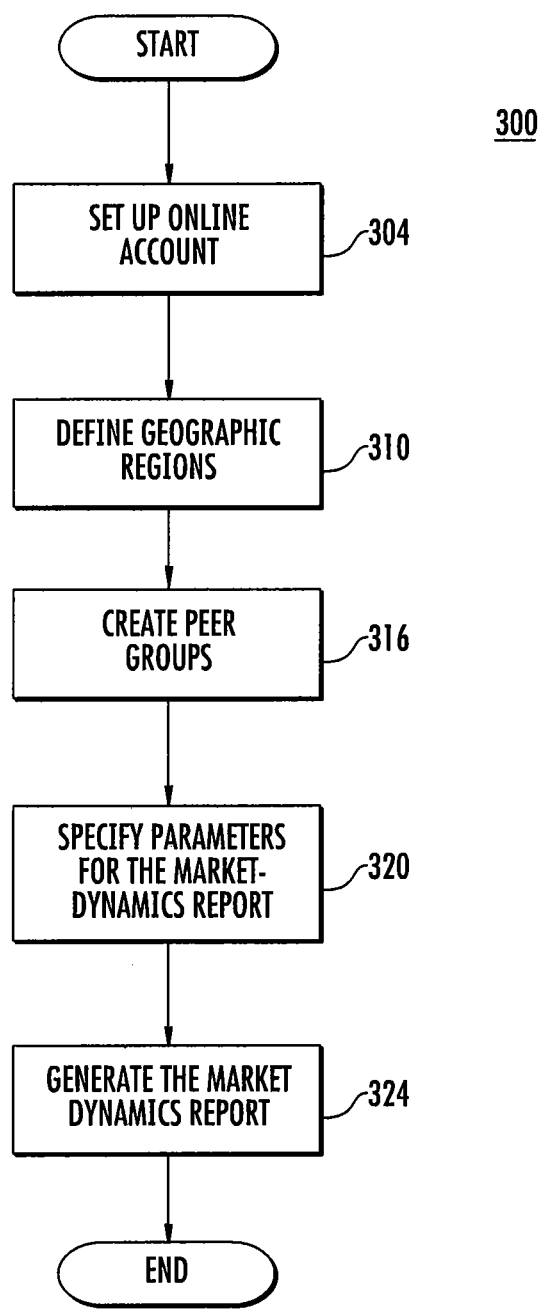

FIG. 3 is a flow chart illustrating an exemplary process of logging into a secure website to access a market-dynamics network and generate a market-dynamics report, according to one embodiment of the present invention.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art, the present invention may be embodied as a method (including a business process), system, computer program product, or a combination of the foregoing. Accordingly, the present invention may take the form of an entirely hardware embodiment, an entirely software embodiment (including firmware, resident software, micro-code, etc.), or an embodiment combining software and hardware aspects that may generally be referred to herein as a "system." Furthermore, the present invention may take the form of a computer program product on a computer-readable medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) signals, or other mediums.

Computer program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

The term "business-merchant" as used herein refers to any individual or any business or non-business entity that sells, distributes, trades or otherwise deals, either as a retailer or wholesaler, in goods and/or services. It should be appreciated that the term business-merchant as used herein includes individuals or business or non-business entities that actually produce/provide the goods and/or services being sold. It should also be appreciated that the term business-merchant as used herein includes individuals or business or non-business entities that distribute the goods and/or services but do not produce/provide the goods and/or services.

The term "consumer" as used herein refers to any individual or any business or non-business entity that buys or otherwise acquires goods and/or services from a business-merchant.

The term "transaction data" as used herein refers to any information relating to the sale of a good and/or service. Exemplary transaction data includes information about the good(s) and/or service(s) exchanged between the consumer and the business-merchant during transactions. Exemplary transaction data also includes information about the consumer, the business-merchant, and the transaction itself. For example, transaction data includes a description of the goods(s) and/or service(s), the quantity of goods(s) and/or service(s), and the price of the good(s) and/or service(s). Also, for example, transaction data includes the consumer's name and address, bank account number, and credit- or debit-card number and the name of the card-issuing bank. Transaction data also includes, for example, information about the business-merchant, such as the business name and location, the location where the exchange occurred, the name and routing number of the business-merchant's acquiring bank, and the account number of the business-merchant's account, which is held at the acquiring bank.

In general terms, described herein are various systems, methods, and computer program products for providing a market-dynamics network that assesses social and economic market dynamics in specific geographic regions. For example, the market-dynamics network collects transaction data from a large number of business-merchants across a large number of geographic locations and appends geographic-location identifiers to the collected transaction data. The market-dynamics network then aggregates transaction data in specific geographic regions and, based on the aggregated transaction data, assesses social and economic market dynamics in the specific geographic regions.

Consumer behavior in a geographic region reflects, to some extent, the market dynamics of that geographic region. What's more, particular consumer-behavior trends tend to correspond to particular changes in market dynamics. For example, changes in market dynamics include population movement to and from the geographic region, changes in affluence of consumers living in the geographic region, and variations in economic stress in the geographic region.

If a particular consumer-behavior trend develops in a geographic region, then a corresponding and predictable change is also occurring in the market dynamics of that geographic region. Accordingly, the market-dynamics network monitors consumer-behavior trends in a specific geographic region to determine the particular changes occurring in market dynamics of that geographic region, even before results of these changes materialize. For example, in some embodiments, the market-dynamics network monitors consumer behavior by collecting and analyzing transaction data, e.g., credit- or debit-card purchases. That is, embodiments of the present invention use transaction data as a proxy for consumer behavior.

For example, a commonly observed consumer-behavior trend is consumer spending shifting from purchases at upscale department stores to purchases at discount stores. This shift may indicate changing social and economic dynamics in the relevant geographic region. For example, affluent consumers may be leaving the region and/or non-affluent consumers may be moving into the region. Also, instead of a change in population, the affluence of the consumers living in that region may be declining. For example, this decline in affluence may have been caused by a particular event, such as a large-scale layoff or a natural disaster.

Also for example, another commonly observed consumer-behavior trend is increasing or decreasing consumption. For example, an increase in the volume of transaction data, e.g., the number of credit- or debit-card purchases, in a particular geographic region may correspond to economic growth in that geographic region. That is, when the volume of transaction data is trending up, the economy in that geographic region may be growing because of increases in affluence and/or population. Likewise, for example, when the volume of transaction data is trending down, the rate of economic growth may be slowing or the economy may be contracting because of decreases in affluence and/or population.

Use of the market-dynamics network disclosed herein enables users, such as merchants, corporate investors and municipalities, to determine changes in economic and social dynamics in specific geographic regions before other data sources identify and publish the changes. For example, by using the market-dynamics network to monitor consumer behavior, users can forecast consumer confidence prior to information releases from other sources. Accordingly, businesses can use the market-dynamics network to strategically plan for business expansion and contraction into and out of certain geographic regions by identifying and monitoring for particular consumer-behavior trends that correspond to population movement and changes in affluence. For example, if, through using the market-dynamics network to monitor consumer behavior, the business observes a consumer-behavior trend that corresponds to population movement into a geographic region, then the business may consider increasing its exposure in that particular geographic region.

The market-dynamics network can also be used to forecast certain market conditions. For example, the market-dynamics network can be used to identify a newly developing customer-behavior trend that indicates economic stress, and, based on that consumer-behavior trend, the market-dynamics network can forecast certain events that will occur if the consumer-behavior trend continues. For example, if the market-dynamics network identifies a negative shift in consumer spending, e.g., a decrease in the volume of transaction data from upscale department stores and an increase in the volume of transaction data from discount stores, that does not correspond with a population change, then the market-dynamics network is configured to predict that consumers will begin to fail to pay on credit-card payments because the relevant geographic region is experiencing an economic downturn. This enables credit-card-issuing banks to be prepared to write off bad debt. Also, to reduce its exposure, the credit-card-issuing back can discontinue issuing credit cards, and reduce/freeze credit limits in that geographic region.

Conversely, for example, if the market-dynamics network identifies a positive shift in consumer spending, e.g., an increase in the volume of transaction data from upscale department stores, that does not correspond with a population change, then the market-dynamics network is configured to report an economic upturn in that geographic region and predict that consumers will repay credit-card debt and that the creditworthiness of consumers is increasing in that geographic region. Accordingly, banks can take advantage of this information by increasing consumers' lines of credit, advertising debt products to consumers, opening new branches, and increasing the number of ATMs in that particular geographic region. Also, upscale department stores can act on this information by opening new stores in that geographic region.

An exemplary market-dynamics network 110 is illustrated in FIG. 1. An administrative terminal 112 provides an administrator 116 with administrative access. This enables the administrator 116 to manage the market-dynamics network 110. The term "administrator" applies to any individual or business or non-business entity that manages the market-dynamics network 110. For example, an administrator 116 can be a bank or other financial institution having access to transaction data 126.

For illustrative purposes, transaction data 126 will be described herein as transaction data 126 obtained at the point-of-sale when a consumer purchases a good or service from a business-merchant 128 using a credit- or debit-card. It should be appreciated, however, that transaction data 126 could be obtained from other types of transactions. For example, transaction data 126 could be obtained from contactless payments, ACH payments, Bill Pay payments, check payments, and cash payments.

Banks are suitable administrators 116 for managing the market-dynamics network 110 because, when a consumer makes a purchase, either online or in a store, the business-merchant 128 sends related transaction data 126 via a payment gateway to its acquiring bank, which is the bank that accepts payments for the goods or services on behalf of the business-merchant 128. The acquiring bank then sends the transaction data 126 to the appropriate card association, e.g., Visa®/MasterCard®, which routes the transaction data 126, along with an authorization request, to the correct card-issuing bank. The card-issuing bank receives the transaction data 126 and authorization request, and sends a response back to the acquiring bank with a code, indicating whether the payment is approved or declined. The acquiring bank then forwards the response code to the business-merchant 128 via the payment gateway.

Accordingly, except for those instances where a single bank is both the acquiring bank and card-issuing bank, two banks—the acquiring bank and the card-issuing bank—receive transaction data 126 related to the sale of any good and/or service. As such, banks, especially large banks having a national presence, receive transaction data 126 for a large number of transactions, and, it follows, that when administered by a large bank, the market-dynamics network 110 collects sufficient transaction data 126 to provide accurate reports that assess social and economic market dynamics in specific geographic regions and reports that compare the social and economic market dynamics of different geographic regions.

For illustrative purposes, the market-dynamics network 110 will be described herein as being administered by a bank-administrator 116. However, it should be appreciated that individuals, non-business entities, and business entities—other than banks—could administer the market-dynamics network 110. For example, a credit-card association or the administrator of a payment gateway could also administer the market-dynamics network 110 because these businesses and associations have access to large amounts of transaction data 126. It should also be appreciated that the market-dynamics network 110 could be administered by an individual, a business entity, or non-business entity that purchases transaction data 126. This transaction data 126 could be purchased from a third-party, such as a bank or credit-card association.

Users 122 access the market-dynamics network 110 via a user terminal 124. The term "user" applies to any individual or any business or non-business entity that uses the market-dynamics network 110. For example, a user 122 could be a specific business-merchant seeking, among other things, reports that assess social and economic market dynamics in specific geographic regions and reports that illustrate how specific geographic regions are changing relative to other geographic regions. A user 122 could also be an investor or any other individual or business or non-business entity, e.g., a municipality, a brokerage firm, or a news organization, that is interested in the market-dynamics of specific geographic markets.

For illustrative purposes, the market-dynamics network 110 will be described herein as being used by a "user business-merchant 122." In the examples provided herein, the user business-merchant 122 is a specific business-merchant using the market-dynamics network 110 to obtain, among other things, reports that assess social and economic market dynamics in specific geographic regions and reports that illustrate how specific geographic regions are changing relative to other geographic regions.

In operation, transaction data 126 is provided to the market-dynamics network 110 from business-merchants 128. For example, business-merchants 128 transmit transaction data 126 to the transaction database 132 via a transaction processing system 130. In an embodiment, the transaction data 126 is credit- and debit-card transaction data 126. For example, to execute a credit- or debit-card transaction, business-merchants 128 transmit credit- or debit-card data 126 to the transaction-processing system 130, which, as described above, verifies the credit- or debit-card account and then processes the transaction.

In an embodiment, the transaction-processing systems 130 include a repository of all processed credit- and debit-card transactions 126, which are made available to the market-dynamics network 110. For example, the bank-administrator 116 downloads the processed credit- and debit-card transactions 126 from the transaction-processing systems 130 to the transaction database 132. In another embodiment, the transaction database 132 is the repository for the transaction-processing systems 130. In this embodiment, the transaction-processing systems 130 send transaction data 126 to the transaction database 132 upon executing a credit- or debit-card transaction.

A geographic-identifier tool 138 is provided for appending a geographic-location identifier to the transaction data 126. For example, in the illustrated embodiment, the transaction data 126 sent to the transaction-processing systems 130 from the business-merchants 128 includes the business-merchant's address information and/or consumer's address information. If the geographic-location identifier does not include the consumer's address, it should be appreciated that the consumer's address information can be obtained from the consumer's credit- or debit-card account. In an embodiment, either the consumer's or the business merchant's address can be used depending on the purpose of the specific analysis. For example, if the analysis is primarily focused on the consumer, then all of the transaction data 126 is assigned to the consumers address. Also, for example, if the analysis is primarily focused on the business-merchant 128, then all of the transaction data 126 is assigned to the business-merchant's address.

The geographic-identifier tool 138, when the transaction data 126 is downloaded to the transaction database 132, appends a geographic-location identifier to each credit- and debit-card transaction in the transaction data 126. Also, in the illustrated embodiment, an indexing tool 144 is provided for indexing the transaction database 132 by the geographic identifiers. This indexing makes the stored credit- and debit-card transactions 126 searchable by geographic location.

A geographic-region tool 140 is provided for defining the geographic regions that are to be analyzed by the market-dynamics network 110, according to an embodiment. User business-merchants 122 can access the geographic-region tool 140 to create user-defined geographic regions. For example, business-merchants 128 can define geographic regions by inputting zip codes, area codes, coordinates, cities, counties, states, or any other geographic parameter know by those having ordinary skill in the art. In the illustrated embodiment, the geographic-region tool 140 defines geographic regions 142 by the geographic-location identifier, which is appended to the transaction data 126 by the geographic-identifier tool 138. As described in more detail below, with reference to FIG. 3, the geographic-region tool 140 can automatically define geographic regions 142 based on information provided by the user business-merchant 122.

The market-dynamics network 110 includes a peer-grouping tool 134 for grouping the geographic regions 142 into peer groups 136. This grouping enables business-merchants 128 to combine multiple geographic regions 142 together for study. For example, the user business-merchant 122 can access the peer-grouping tool 134 and assign geographic regions 142 to peer groups 136. As described in more detail below, with reference to FIG. 3, the peer-grouping tool 134 can automatically assign geographic regions 142 to peer groups 136 based on information provided by the user business-merchant 122.

To provide the user business-merchant 122 with an accurate assessment of the market dynamics of specific geographic regions 142, the market-dynamics network 110 includes a market-dynamics-assessment tool 114, which receives the geographic regions 142 and the peer groups 136 and then accesses the transaction database 132, which is indexed according to geographic-region identifiers, and retrieves transaction data 126 from the geographic regions 142.

The market-dynamics-assessment tool 114 then generates a market-dynamics report 118 that illustrates, for example, how the geographic regions 142 of one peer group 136 are changing relative to the geographic regions 142 of the other peer group 136. The market-dynamics report 118 also shows market dynamics associated with credit risk and market potential in each of the geographic regions 142. The market-dynamics report 118 identifies which user-defined geographic regions 142 are becoming more or less desirable from credit risk and population migration perspectives. This information is valuable for enhancing user business merchant's risk management, investment decisions, and strategic planning related to marketing and store location strategies.

For example, bank-administrators 116 can use the market-dynamics reports 118 to monitor industry trends indicating market shifts toward or away from different types of retailers, such as discount, specialty, department, etc. Bank-administrators 116 can also use these market-dynamics reports 118 to evaluate the credit risk of merchant clients and appropriately reduce exposure to declining merchants and increase exposure to growing merchants.

The market-dynamics-assessment tool 114, in an embodiment, provides point-in-time market analysis and trend-over-time analysis. To provide point-in-time market analysis, the market-dynamics-assessment tool 114 accesses the transaction database 132 to obtain the latest transaction data 126. To provide trend-over-time market analysis, the market-dynamics-assessment tool 114 obtains from the transaction database 132 current transaction data 126 and historical transaction data 126, which dates back to a preselected time and relates to the relevant geographic regions 142.

A raw data tool 146 is also provided. According to an embodiment, the raw-data tool 146 provides user business-merchants 122 with direct access to the transaction data 126 stored in the transaction database 132. The raw data tool 146 includes search engines that enable user business-merchants 122 to manually search the transaction data 126, which is indexed by geographic-location identifiers provided by the geographic-identifier tool 138.

An example scenario in which the market-dynamics network 110 is useful will now be described. If a business-merchant 128 operates stores that are over-performing in certain locations but under-performing in other locations, the business-merchant 128 can use the geographic-region tool 140 to define various geographic regions 142 that represent the under- and over-performing locations. Using the peer-grouping tool 134, the user business-merchant can then assign the geographic regions 142 that represent the over-performing locations to one peer group 136 and the geographic regions 142 that represent under-performing locations to another peer group 136. The business-merchant 128 can then instruct the market-dynamics network 110 to generate a market-dynamics report 118 that compares the market dynamics of the two peers groups. This market-dynamics report 118 will enable the business-merchant 128 to determine the reason for the under-performance. For example, the reason may be increases in economic stress and/or decreases in consumer affluence and population.

Another example scenario in which the market-dynamics network 110 is useful will now be described. If a user business-merchant 122 is considering expanding into new geographic markets, it can use the market-dynamics network 110 to identify geographic markets where the social and economic dynamics will support the expanding business.

In this scenario, according to one embodiment, the business-merchant 128 accesses the geographic-region tool 140 to define various geographic regions 142 that represent the geographic markets in which the user business-merchant 122 is considering expanding. The user business-merchant 122 instructs the market-dynamics network 110 to generate a market-dynamics report 118 that illustrates which geographic regions 142 are becoming more or less desirable from credit risk and population migration perspectives. The user business-merchant 122 then uses this market-dynamics report 118 to determine which geographic regions 142 are desirable for business expansion.

In the same scenario as described above, according to another embodiment, in addition to using the geographic-region tool 140 to define various geographic regions 142 that represent the geographic markets in which the user business-merchant 122 is considering expanding, the user business-merchant 122 accesses the peer-grouping tool 134 and assigns the geographic regions 142 into peer groups 136. This enables the user business-merchant to compare multiple geographic regions 142. After creating peer groups 136, the user business-merchant 122 instructs the market-dynamics network 110 to generate a market-dynamics report 118 that compares the market dynamics of the various peer groups 136. This market-dynamics report 118 will provide the user business-merchant 122 with valuable information, such as which geographic regions 142 have population size and affluence that is suitable for business expansion.

Also in the same scenario as described above, according to yet another embodiment, the user business-merchant 122 accesses the geographic-region tool 140 to define geographic regions 142 where the user business-merchant 122 currently has successful stores, in addition to defining the different geographic regions 142 that the user business-merchant 122 is considering for business expansion. Then the user business-merchant 122 accesses the peer-grouping tool 134 to assign the geographic regions 142 that are being considered for expansion to one peer group 136 and the geographic regions 142, where the currently successful stores are located to another peer group 136. The user business-merchant 122 then instructs the market-dynamics network 110 to generate a market-dynamics report 118 comparing the two peer groups 136 to determine whether the user business-merchant should expand into the new geographic regions. For example, the user business-merchant should expand its business if the market dynamics of the geographic regions 142 that are being considered for expansion are as favorable as the market dynamics of the geographic regions 142 where successful stores are located.

Referring now to FIG. 2, a flow chart is provided that illustrates an exemplary procedure 200 for generating market-dynamics reports 118 that can be sold or otherwise distributed. For example, the generated market-dynamics reports 118 can be sold to and used by the business-merchants 128 and financial institutions, such as banks and corporate investors, to make management and investment decisions.

The market-dynamics network 110 generates market-dynamics reports 118 based, in part, on transaction data 126 collected from business-merchants 128. Accordingly, in step 202, the exemplary procedure 200 generally begins with obtaining transaction data 126. In the exemplary embodiment, the transaction data 126 is credit- and debit-card transactions. These credit- and debit-card transactions are obtained by transaction-processing systems 130, which, in this example, are owned and managed by the bank-administrator 116. The transaction-processing systems 130 obtain the transaction data 126, for example, when the bank-administrator 116 is either the acquiring bank or the card-issuing bank for a credit- or debit-card transaction.

Next, in step 204, transaction data 126 is extracted from the transaction-processing system 130 and stored in the transaction database 132. The geographic-identifier tool 138 appends geographic-location identifiers to the transaction data 126 and the indexing tool 144 indexes the transaction data 126 by the geographic-location identifiers such that the stored transaction data 126 is searchable by geographic location.

In step 206, the geographic-region tool 140 is used to define geographic regions 142 that are to be analyzed by the market-dynamics network 110, and, in step 208, the peer-grouping tool 134 is used to group the geographic regions 142 into peer groups 136. The peer-grouping tool 134 is configured to enable a user business-merchant 122 to manually assign geographic regions 142 to peer groups 136. For example, as described in more detail below, the user business-merchant 122 logs into a secure website and manually assigns geographic regions 142 to peer groups 136. It should also be appreciated that the peer-grouping tool 134 could be configured to automatically group user-defined geographic regions 142 into peer groups 136. This automatic assignment of geographic regions 142 to peer groups 136 is described in more detail below, with reference to FIG. 3.

In step 210, the market-dynamics-assessment tool 114 accesses the transaction database 132 to retrieve transaction data 126 for each of the geographic regions 142 of the relevant peer groups 136, and then the market-dynamics-assessment tool 114 generates the market-dynamics reports 118. The market-dynamics reports 118 are distributed in step 212. Embodiments of the market-dynamics network 110 provide a number of ways for selling and distributing the market-dynamics reports 118. For example, as described below, a secure website may be provided. Individuals or entities can register and pay to access the secure website to obtain market-dynamics reports 118. Also for example, printouts and emails of the market-dynamics reports 118 can be distributed.

Referring again to FIG. 1, a web server 150 is provided for hosting a secure website 152. User business-merchants 122 can access the secure website 152 to set up an account and access the market-dynamics network 110. The bank-administrator 116 can increase revenue from existing customers and attract new customers by inviting business-merchants 128 who are existing bank customers and those who are non-bank customers to set up an account. For example, the bank-administrator 116 can provide a payment-based membership, which gives business-merchants 128 access to the market-dynamics network 110. The bank-administrator 116 can, for example, target business-merchants 128 that, although may already have access to some market research, are interested in market-dynamics information about specific geographic regions 142. For example, a small business owner or even a large retailer may already have access to some information that provides market dynamics for large geographic areas, such as states or countries, but they may not have access to customizable, comprehensive, and accurate reports, such as a market-dynamics report 118 that describes market-dynamics at varying geographic levels using up-to-date transaction data 126.

Referring now to FIG. 3, a process 300 is provided for existing bank customers and non-bank customers to access the market-dynamics network 110 via a secure website 152. In this example, existing bank customers and non-bank customers are referred to as user business-merchants 122. In step 304, the user business-merchant 122 seeking access to the market-dynamics network 110 sets up an online account. For example, the bank-administrator 116 makes available the secure website 152, which is hosted on the web server 150, to user business-merchants 122.

User business-merchants 122 can access the secure website 152 via the user terminal 124 to set up an online account. To set up online accounts, the market-dynamics network 110 obtains business and financial information from the user business-merchants 122. For example, the market-dynamics network 110 requests that user business-merchants 122 provide information, such as types of products and services sold, relevant geographic markets, quantities sold, and revenues.

In an embodiment, in addition to obtaining business and financial information directly from the user business-merchant 122 during account set up, the market-dynamics network 110 obtains transaction data 126 that involves the user business-merchant 122 from the transaction database 132. To do so, the market-dynamics network 110 searches the transaction database 132 for transaction data 126 related to the user business-merchant 122. From this information, the market-dynamics network 110 can determine where the business merchant 122 has stores and which geographic regions 142 account for the highest transaction volumes for that particular user business-merchant 122. This information is useful when the market-dynamics network 110 automatically defines geographic regions 142 and automatically assigns geographic regions 142 to peer groups 136. It should be appreciated that this transaction data 126 is updated and maintained on a regular basis. Transaction data 126 involving the user business-merchant 122 can also be obtained directly from the transaction-processing systems 130 and/or from other institutions that maintain systems that process financial transactions such as credit- and debit-card transactions.

In step 310, the user business-merchant 122 accesses the geographic-region tool 140 via the secure website 152 to define geographic regions 142. In an embodiment, the user business-merchant 122 instructs the geographic-region tool 140 to automatically define geographic regions 142. The geographic-region tool 140 accesses the information entered by the user business-merchant 122 upon account set up and the information related to the user business-merchant 122, which was downloaded from the transaction database 132, to automatically define geographic regions 142. For example, the geographic-region tool 140 defines geographic regions 142 to include geographic markets where the user business-merchant 122 is not currently operating, but where the market dynamics indicate that the user business-merchant 122 will be successful. As previously described with reference to FIG. 1, it should be appreciated that the user business-merchant 122 can also access the geographic-region tool 140 to manually define geographic regions 142.

In step 316, the user business-merchant 122 accesses the peer-grouping tool 134. In one embodiment, the peer-grouping tool 134 automatically creates peer groups 136 consisting of geographic regions 142, which were defined by the geographic-region tool 140 in step 310. To do so, the peer-grouping tool 134 accesses the business and financial information provided by the user business-merchant 122 when the user business-merchant 122 set up its online account. Based on this information, the peer-grouping tool 134 automatically creates peer groups 136 consisting of geographic regions 142 where the user business-merchant 122 already has stores, and the peer-grouping tool 134 creates other peer groups 136 consisting of geographic regions 142 where the user business-merchant 122 does not have stores. Also for example, the user business-merchant 122, using the peer-grouping tool 134, can manually create peer groups 136 by assigning geographic regions 142 to peer groups 136.

In an embodiment, the market-dynamic network 110 suggests geographic locations that the user business-merchant 122 should enter. To do so, the market-dynamic network 110, based on transaction data 126 obtained from a large number of different geographic locations, uses the geographic-region tool 140 to create suggested geographic regions 142 and the peer-grouping tool 134 to create peer groups 136 consisting of those suggested geographic regions 142.

After creating peer groups using the peer-grouping tool 134, the user business-merchant 122 can access the market-dynamics-assessment tool 114 to generate market-dynamics reports 118. In step 320, the user business-merchant 122 accesses the market-dynamics-assessment tool 114 to specify parameters for the market-dynamics report 118. For example, the user business-merchant 122 instructs the market-dynamics-assessment tool 114 to create a "snapshot" report 118 and/or a "trend over time" report 118. For example, a "trend over time" market-dynamics report 118 is based on historical transaction data 126 dating back to a preselected time, whereas a "snapshot" market-dynamics report 118, which is also referred to as a "point-in-time" market-dynamics report 118, is based on the most recent transaction data 126.

The user business-merchant 122, for example, also instructs the market-dynamics-assessment tool 114 to create a "comparison" market-dynamics report 118 and/or a "general assessment" market-dynamics report 118. A "comparison" market-dynamics report 118 compares the market dynamics of the different peer groups 136.

For example, a "comparison" market-dynamics report 118 shows the credit risk and market potential within each geographic region 142, illustrates how some geographic regions 142 are changing relative to others, and identifies which geographic regions 142 are becoming more or less desirable from credit risk and population migration perspectives. In addition to comparing credit risk and population dynamics across various geographic regions 142, these "comparison" market-dynamics reports 118 show relationships between different peer groups 136 of geographic regions 142 and thereby provide an overview of the economy and population dynamics. These "comparison" market-dynamics reports 118 can be customized to assess the market dynamics of geographic regions 142 where the user business-merchant 122 has stores vis-a-vis the geographic regions 142 where the user business-merchant 122 does not have stores. This information provided from these "comparison" market-dynamics reports 118 is valuable for enhancing the user business merchant's 122 risk management, investment decisions, and strategic planning related to marketing and store location strategies.

For example, a "general assessment" market-dynamics report 118 summarizes consumer behavior for specific geographic regions 142. For example a "trend over time general assessment" report 118 forecasts whether specific geographic regions 142 are becoming more or less desirable from credit risk and population migration perspectives. This information is valuable to the user businesses-merchant 122 because it provides an enhanced understanding of consumer-behavior trends in specific geographic regions 142. Information from these "general assessment" market-dynamics reports 118 can also be used to determine consumer health and predict commercial real estate values in specific geographic regions 142. Also, for user business-merchants 122 attempting to alter its distribution of payment types, the "general assessment" market-dynamics reports 118 can be used to identify trends in payment method in the specific geographic regions 142.

Next, in step 324, the user business-merchant 122, via the secure website 152, instructs the market-dynamics-assessment tool 114 to generate the specified market-dynamics reports 118 and then, in step 328, the user business-merchant 122 views the market-dynamics reports 118 via a display screen of the user terminal 124.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A computer-implemented method for assessing a geographic region, the method comprising:
    collecting transaction data from a plurality of transactions involving a business-merchant and a consumer;
    storing the transaction data in a transaction database;
    determining, using a computer processing device, geographic-location identifiers configured to be appended to the transaction data based at least partially on a location information of the business-merchant and a home address information of the consumer involved in each of the plurality of transactions;
    appending the geographic-location identifiers to each of the plurality of transactions of the transaction data in the transaction database, wherein each of the geographic-location identifiers is indicia separate from the collected transaction data;
    indexing the transaction database by the geographic-location identifiers appended to the transaction data to thereby provide a transaction database searchable by the geographic-location identifiers;
    providing the transaction database searchable by the geographic-location identifiers appended to the transaction data based at least partially on the indexing the transaction database;
    providing a search tool associated with the transaction database, the search tool being useable by a user to search the transaction database for transaction data by the geographic-location identifiers appended to the transaction data;
    receiving an instruction that defines the geographic region to be assessed;
    obtaining from the transaction database transaction data appended with geographic-location identifiers that correspond to the geographic region;
    determining, using a computer processing device, change in market dynamics relating to a change in credit risk of the geographic region based at least partially on the obtained transaction data appended with the geographic-location identifiers; and
    generating, using a computer processing device, a predicted future change in market dynamics of the geographic region corresponding to the determined change in market dynamics based at least partially on the determined change in market dynamics and the obtained transaction data appended with the geographic-location identifiers.

2. The computer-implemented method of claim 1, wherein the geographic region is a plurality of user-defined geographic regions.

3. The computer-implemented method of claim 2, further comprising:
    comparing the transaction data of the different user-defined geographic regions.

4. The computer-implemented method of claim 2, further comprising:
    assigning the user-defined geographic regions to two or more peer groups.

5. The computer-implemented method of claim 4, further comprising:
    generating a report illustrating how the user-defined geographic regions of one of the peer groups are changing relative to the user-defined geographic regions of another one of the peer groups.

6. The computer-implemented method of claim 1, further comprising:
    generating a report that assesses the geographic region based on the transaction data obtained from the transaction database, wherein the report is a point-in-time report.

7. The computer-implemented method of claim 1, further comprising:
    generating a report that assesses the geographic region based on the transaction data obtained from the transaction database, wherein the report is a trend-over-time report.

8. The computer-implemented method of claim 1, wherein the geographic-location identifier identifies the geographic location where the transaction occurred.

9. The computer-implemented method of claim 1, wherein the geographic-location identifier identifies the location of the business involved in the transaction.

10. The computer-implemented method of claim 1, wherein the geographic-location identifier identifies the address of the consumer.

11. The computer-implemented method of claim 1, wherein the transaction data is a plurality of credit- and debit-card transactions.

12. The computer-implemented method according to claim 1, further comprising:
    generating a recommendation for a course of action corresponding to the predicted future change in market dynamics.

13. The computer-implemented method of claim 1, wherein the collecting comprises collecting at a plurality of point of sales and during a plurality of transactions involving businesses and consumers.

14. The computer-implemented method of claim 1, wherein the change in the market dynamics, alternatively, relates to at least one of a change in consumer population affluence, consumer population migration, change in volume of consumer transaction data, or change in market potential of the geographic area.

15. An apparatus for assessing the market dynamics of at least a geographic region, the apparatus comprising:
- a transaction-processing system device configured to receive transaction data from a plurality of businesses located in a plurality of geographic locations, wherein the transaction data comprises a plurality of transactions involving a plurality of transaction involving, at least, one business and a consumer;
- a transaction database for storing the transaction data received from the transaction-processing system;
- a computer processor;
- a geographic-identifier application, executed by said computer processor, wherein said geographic-identifier application:
  - determines geographic-location identifiers configured to be appended to the transaction data based at least partially on a location information of the one business and a home address information of the consumer involved in each of the plurality of transactions;
  - appends the geographic-location identifiers to each of the plurality of transactions of the transaction data in the transaction database, wherein the geographic-location identifier is indicia separate from the received transaction data;
- wherein the computer processor is further configured to:
  - index the transaction database by the geographic-location identifiers appended to the transaction data to thereby provide a transaction database searchable by the geographic-location identifiers;
  - provide the transaction database searchable by the geographic-location identifiers appended to the transaction data based at least partially on the indexing the transaction database;
  - provide a search tool associated with the transaction database, the search tool being useable by a user to search the transaction database for transaction data by the geographic-location identifiers appended to the transaction data;
- a geographic-region application, executed by said computer processor, wherein said geographic-region application defines the geographic region; and
- a market-dynamics-assessment application, executed by said computer processor, wherein said market-dynamics-assessment application:
  - determines change in the market dynamics relating to a change in credit risk of the geographic region based, at least partially, on the transaction data having the appended geographic-identifiers that is associated with the geographic region as defined by the geographic-region application to thereby generate a determined change in market dynamics for the geographic region and
  - generates a predicted future change in the market dynamics of the geographic region corresponding to the determined change in market dynamics based, at least partially, on the determined change in market dynamics and the assessment of transaction data appended with geographic-location identifiers obtained from the transaction database.

16. The apparatus of claim 15, further comprising:
- a peer-grouping application, executed by said computer processor, wherein said peer-grouping assigns the user-defined geographic regions into a peer group.

17. The apparatus of claim 15, further comprising:
- a raw-data application, executed by said computer processor, wherein said raw-data application enables a user to directly access the transaction data.

18. A computer-implemented method, comprising:
- receiving transaction data from a plurality of sources, wherein the transaction data comprises a plurality of transactions involving, at least, one business and a consumer;
- storing the transaction data in a transaction database;
- determining geographic-location identifiers configured to be appended to the transaction data based at least partially on a location of the business-merchant and a home address information of the consumer involved each of the plurality of transactions;
- appending geographic-location identifiers to each of the plurality of transactions of the transaction data in the transaction database, wherein each the geographic-location identifiers is indicia separate from the received transaction data;
- indexing the transaction database by the geographic-location identifiers appended to the transaction data to thereby provide a transaction database searchable by the geographic-location identifiers;
- providing the transaction database searchable by the geographic-location identifiers appended to the transaction data based at least partially on the indexing the transaction database;
- providing a search tool associated with the transaction database, the search tool being useable by a user to search the transaction database for transaction data by the geographic-location identifiers appended to the transaction data;
- defining, using the search tool, a geographic region;
- obtaining from the transaction database the transaction data appended with the geographic-location identifier that corresponds to the defined geographic region;
- determining, using a processing device, change in market dynamics relating to a change in credit risk of the geographic region based on the obtained transaction data appended with the geographic-location identifiers; and
- generating, using a processing device, a predicted future change in market dynamics of the geographic region corresponding to the determined change in market dynamics based, at least partially, on the determined change in market dynamics and the obtained transaction data appended with the geographic-location identifiers.

19. The computer-implemented method of claim 18, wherein the transaction data is a plurality of credit- and debit-card transactions received from a plurality of business-merchants.

20. The computer-implemented method of claim 18, wherein the geographic-location identifier identifies a location where the transaction occurred.

21. The computer-implemented method of claim 18, wherein the geographic-location identifier identifies a location of the business-merchant.

22. The computer-implemented method of claim 18, wherein the geographic-location identifier identifies an address of an account holder of the credit- or debit-card account.

23. The computer-implemented method of claim 18, wherein the geographic-region is a plurality of user-defined geographic regions.

24. The computer-implemented method of claim 23, further comprising:
  generating a report that assesses the defined geographic region based on the transaction data obtained from the transaction database, wherein the report compares the transaction data of the different user-defined geographic regions.

25. The computer-implemented method of claim 24, further comprising:
  assigning the user-defined geographic regions to two or more peer groups.

26. The computer-implemented method of claim 25, further comprising:
  generating a report that assesses the defined geographic region based on the transaction data obtained from the transaction database, wherein the report illustrates how the user-defined geographic regions of one of the peer groups are changing relative to the user-defined geographic regions of another one of the peer groups.

27. A computer program product for assessing a geographic region, the computer program product comprising a non-transitory computer-readable medium, wherein the non-transitory computer-readable medium comprises one or more computer-executable code portions that, when executed by a computer, cause the computer to:
  collect transaction data from a plurality of transactions involving a business-merchant and a consumer;
  store the transaction data in a transaction database;
  determine geographic-location identifiers configured to be appended to the transaction data based at least partially on a location of the business-merchant and a home address information of the consumer involved each of the plurality of transactions;
  append geographic-location identifiers to each of the plurality of transactions in the transaction data in the transaction database, wherein each of the geographic-location identifiers is indicia separate from the collected transaction data;
  index the transaction database by the geographic-location identifiers appended to the transaction data to thereby provide a transaction database searchable by the geographic-location identifiers;
  provide the transaction database searchable by the geographic-location identifiers appended to the transaction data based at least partially on the indexing the transaction database;
  provide a search tool associated with the transaction database, the search tool being useable by a user to search the transaction database for transaction data by the geographic-location identifiers appended to the transaction data;
  define the geographic region to be assessed;
  obtain from the database the transaction data and the geographic-location identifiers that correspond to the defined geographic region;
  assess the obtained transaction data appended with the geographic-location identifiers;
  determine change in market dynamics relating to a change in credit risk of the geographic region based at least partially on the obtained transaction data appended with the geographic-location identifiers to thereby generate a determined change in market dynamics for the geographic region; and
  generate a predicted future change in market dynamics of the geographic region corresponding to the determined change in market dynamics based, at least partially, on the obtained transaction data appended with the geographic-location identifiers.

28. The computer program product of claim 27, wherein the geographic region is a plurality of user-defined geographic regions.

29. The computer program product of claim 28, further configured to cause the computer to:
  generate a report that assesses the geographic region based on transaction data obtained from the transaction database, wherein the report compares the transaction data of the user-defined geographic regions.

30. The computer program product of claim 28, further configured to cause the computer to:
  assign the user-defined geographic regions to two or more peer groups.

31. The computer program product of claim 30, further configured to cause the computer to:
  generate a report that assesses the geographic region based on transaction data obtained from the transaction database, wherein the report illustrates how the geographic regions of one of the peer groups are changing relative to the geographic regions of another one of the peer groups.

32. A system for assessing a geographic region, the system comprising:
  a computer processing device configured to:
    receive transaction data from a plurality of sources, wherein the transaction data comprises a plurality of transactions involving, at least, one business and a consumer;
    store the transaction data in a transaction database;
    determine geographic-location identifiers configured to be appended to the transaction data based at least partially on a location of the business-merchant and a home address information of the consumer involved each of the plurality of transactions;
    append the geographic-location identifiers to each of the plurality of transactions of the transaction data in the transaction database, wherein each the geographic-location identifiers is indicia separate from the received transaction data;
    index a transaction database by the geographic-location identifiers appended to the transaction data to thereby provide a transaction database searchable by the geographic-location identifiers;
    provide the transaction database searchable by the geographic-location identifiers appended to the transaction data based at least partially on the indexing the transaction database;
    provide a search tool associated with the transaction database, the search tool being useable by a user to search the transaction database for transaction data by the geographic-location identifiers appended to the transaction data;
    receive a set of instructions that defines the geographic region to be assessed,
    identify transaction data that comprises geographic-location identifiers that correspond to the geographic region as defined by the set of instructions;
    determine change in market dynamics relating to a change in a credit risk of the geographic region based on the identified transaction data appended with the geographic-location identifiers; and
    generate a corresponding and predicted future change in market dynamics of the geographic region based, at least partially, on the identified transaction data appended with the geographic-location identifiers and determined change in market dynamics corresponding to the geographic region.

33. The system of claim 32, wherein the transaction data is a plurality of credit- and debit-card transactions and the sources are business-merchants.

34. The system of claim 32, wherein the geographic region is a plurality of user-defined geographic regions.

35. The system of claim 34, wherein the report compares the transaction data of the user-defined geographic regions.

36. The system of claim 34, wherein the computer processing device is further configured to assign the user-defined geographic regions to two or more peer groups.

37. The system of claim 36, further comprising generating a report that assesses the geographic region based on transaction data obtained from the transaction database, wherein the report illustrates how the geographic regions of one of the peer groups are changing relative to the geographic regions of another one of the peer groups.

\* \* \* \* \*